Patented Sept. 20, 1949

2,482,521

UNITED STATES PATENT OFFICE 2,482,521

HALOGENATED PHENACYLPYRIDINES

James M. Smith, Jr., North Plainfield, N. J., assignor to American Cyanamid Company, New York, N. Y., a corporation of Maine No Drawing. Application January 24, 1947, Serial No. 724,237

5 Claims. (Cl. 260—287)

This invention relates to new organic compounds and to methods of preparing the same. The application is a continuation-in-part of my application Serial Number 598,627, filed June 9, 1945, now Patent Number 2,442,865.

The new compounds of the present invention may be illustrated by the following general formula:

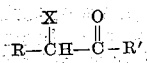

in which X is a halogen, R is a member of the group consisting of pyridine, benzopyridine and alkyl pyridine radicals, and R' is a halogenated aryl radical. The compounds are characterized as being crystalline solids, substantially insoluble in water and difficultly soluble in inert organic solvents. These new compounds are useful as intermediates in the preparation of analgesics and other useful organic compounds, some having therapeutic properties.

Compounds having the above formula may be prepared by treating a compound having the formula R—CH₂—CO—R' with a halogen, such as bromine or chlorine, while suspended or dissolved in a suitable organic liquid at temperatures of from about 10° C. to 100° C., preferably between 20° and 50° C. The resulting product which is halogenated at the omega position may be used directly or it may be isolated by precipitation upon dilution of the solvent with water or by evaporation of the solvent, as illustrated in the specific examples.

Among the phenacylpyridines which may be halogenated at the omega position in accordance with the process of the present invention are such phenacylpyridines as 2-(p-chlorophenacyl) pyridine, 2-(o-chlorophenacyl) pyridine, 2-(m-chlorophenacyl pyridine, 2-(p-bromophenacyl) pyridine, 2-(p-iodophenacyl) pyridine, 2-(o-dichlorophenacyl) pyridine, 2-(p-chlorophenacyl)-5,6-benzopyridine, 4-(p-bromophenacyl)-5,6-benzopyridine, 2-methyl-6-(p-chlorophenacyl) pyridine, 4-methyl-2-(p-chlorophenacyl) pyridine, 4,6-dimethyl-2-(p-chlorophenacyl) pyridine, 2-methyl-5-ethyl-6-(p-bromophenacyl) pyridine, and other phenacylpyridines having alkyl or alkylene substituents on the pyridine ring and one or more halogens on the benzene ring.

To properly halogenate the phenacylpyridine at the omega position I use a substantially equimolar proportion of the halogen; that is, about two equivalents of halogen for each mole of the phenacylpyridine. If a large excess of halogenating agent is used, for example, more than 10% of the theoretical requirements, the yield of pure product is greatly reduced.

As solvents for the reaction there may be used glacial acetic acid, trichlorethylene, ethylene dichloride, diethyl ether, dibutyl ether, chloroform, carbon disulfide, alcohol, and other organic liquids which are substantially inert to the halogenating agent under conditions of the reaction. In general, the presence of water is to be avoided as it tends to cause hydrolysis with resulting splitting of the phenacylpyridine. Of the various solvents, I greatly prefer to use glacial acetic acid although ether is preferred when halogenating 2-phenacyl-benzopyridine.

Although the reaction proceeds rapidly and reaches a substantial degree of completion within a few minutes, particularly when using chlorine at room temperature, it may be advisable, and will do no harm, to allow the reactants to remain in contact for several hours.

The invention will be illustrated in greater detail by means of the following specific examples in which representative phenacylpyridines are halogenated in the omega position to produce the new compounds of the present invention. It is to be understood that these examples are intended to illustrate the invention and are not in limitation thereof since, obviously, certain changes may be made therein by those skilled in the art. All parts are by weight unless otherwise indicated. Inasmuch as the phenacylpyridines having halogen substituents on the benzene ring are also new compounds, the preparation starts with known intermediates. The 1-(halophenyl)-2-(pyridyl) acetylenes are claimed in my copending application Serial Number 725,722 filed Jan. 31, 1947.

*Example I*

A mixture of 1,500 parts of p-chlorobenzaldehyde, 990 parts of alpha-picoline, and 1,088 parts of acetic anhydride are heated under reflux in an atmosphere of nitrogen for 18 hours. Low-boiling products and unreacted ingredients are then removed by vacuum distillation until approximately 1,500 parts of distillate are obtained. The residue is poured into several volumes of cold water, resulting in the precipitation of a brown crystalline solid which is isolated by filtration. This is dissolved in an excess of 2 N. hydrochloric acid and extracted with ether or other organic solvent, such as benzene, to remove impurities. The acid solution is then neutralized with caustic, and the resultant precipitate filtered off, washed with water, and dried. The yield of crude 1-(p-chlorophenyl)-2-(2-pyridyl)ethylene is approximately 1,245 parts. Purification of the product may be accomplished by recrystallization of the base or its hydrochloride from a suitable organic solvent such as alcohol with the aid of decolorizing charcoal, or by vacuum distillation of the base, which boils at 173–180° C./5–7 mm. The purified base melts at 83–84° C., and the hydrochloride melts at 193–195° C.

To a solution of 550 parts of crude 1-(p-chlorophenyl)-2-(2-pyridyl) ethylene in 2,850 parts of chloroform at 60° C. is added a solution of 408 parts of bromine in 600 parts of chloroform over approximately an hour's time. Refluxing is continued for an additional half hour, and the mixture is then allowed to stand overnight at room temperature. A white precipitate forms slowly, which is filtered off the next day after cooling the reaction mixture in an ice bath. Approximately 680 parts of 1,2-dibromo-1-(p-chlorophenyl)-2-(2-pyridyl) ethane is obtained, which melts at 174–175° C. An additional 125 parts of product can be obtained by distilling off part of the chloroform from the mother liquor, yielding a dark brown solid which can be purified by recrystallization from chloroform or other organic solvent. A hydrochloride of the base can be prepared by the addition of alcoholic HCl to a solution of the base in alcohol. This melts at 183–184° C.

To a solution of 658 parts of potassium hydroxide (86% real) in 3,950 parts of alcohol is added 1,263 parts of 1,2-dibromo-1-(p-chlorophenyl)-2-(2-pyridyl)ethane. This mixture is heated under reflux for one hour, and then filtered hot from potassium bromide. The filtrate is then cooled in an ice bath, resulting in the formation of a crystalline precipitate, which is filtered off, washed with cold alcohol, and dried at 45° C. This represents approximately 282 parts of 1-(p-chlorophenyl)-2-(2-pyridyl)acetylene with a crude melting point of 98.6–100° C. The addition of several volumes of water to the mother liquor results in the precipitation of 400 parts of a light tan solid which melts at 50–80° C. On recrystallization of this material from alcohol, approximately 100 additional parts of 1-(p-chlorophenyl)-2-(2-pyridyl)acetylene can be obtained. The purified base melts at 99–100.5° C.

To a mixture of 1,400 parts of water and 2,590 parts of 95% sulfuric acid at 125° C. is added 300 parts of 1-(p-chlorophenyl)-2-(2-pyridyl) acetylene. The mixture is rapidly heated to refluxing (142° C.) and held there for five minutes, after which it is cooled and diluted with several volumes of ice water. It is then neutralized with caustic, resulting in the formation of a greenish-yellow precipitate. This is filtered off at room temperature, washed well with water, and dried at 45° C. Approximately 310 parts of 2-(p-chlorophenacyl)pyridine is obtained which, after recrystallizing from dilute alcohol, melts at 86–87.6° C. The hydrochloride can be prepared by dissolving the base in alcohol and adding an equivalent amount of alcoholic hydrogen chloride. Addition of ether slowly precipitates the hydrochloride as a white solid melting at 176.6–180° C.

To a solution of 220 parts of 2-(p-chlorophenacyl)pyridine in 925 parts of glacial acetic acid at 18° C. is added a solution of 152 parts of bromine in 157 parts of glacial acetic acid over a 75 minute period. The mixture is then allowed to stir at room temperature for about four hours. A cream-colored precipitate forms slowly, which is filtered off, washed with ether, and dried. A yield of approximately 353 parts of 2-(ω-bromo-p-chlorophenacyl)pyridine hydrobromide is obtained, which melts at 172–175° C. (dec.). In water the hydrobromide hydrolyzes to the corresponding base, which can be recrystallized from alcohol, and melts at 97–98° C.

*Example II*

A mixture of 600 parts of p-chlorobenzaldehyde, 396 parts of gamma-picoline, and 435 parts of acetic anhydride are heated to refluxing in an atmosphere of nitrogen for six hours. On cooling, a crystalline mass is formed, which is drowned in several volumes of water and filtered. The press cake is dissolved in an excess of warm dilute hydrochloric acid and filtered from a small amount of insoluble material. On cooling to 10° C. a heavy precipitate is formed, which is filtered off and then slurried in acetone to remove dark colored impurities. On refiltering and drying, approximately 671 parts of 1-(p-chlorophenyl)-2-(4-pyridyl)ethylene hydrochloride is obtained, which is a yellow product melting at 248—249—250° C. The free base, prepared by neutralizing an aqueous solution of the hydrochloride with caustic, melts at approximately 110° C.

To a solution of ten parts of 1-(p-chlorophenyl)-2-(4-pyridyl)-ethylene in 52.5 parts of glacial acetic acid at room temperature is added a solution of 7.44 parts of bromine in 10 parts of glacial acetic acid over a half hour period. A thick orange precipitate is formed immediately. The mixture is then heated to refluxing, giving momentary complete solution followed by reprecipitation, and held there for 1.5 hours, after which it is allowed to stand overnight. Upon filtering and drying, approximately 16.5 parts of a product which probably is 1-(p-chlorophenyl)-(1- or 2-bromo)-2-(4-pyridyl) ethylene hydrobromide is obtained, which melts with decomposition at 275–280° C.

To a solution of 3.9 parts of potassium hydroxide in 24 parts of alcohol is added 7.5 parts of 1-(p-chlorophenyl)-(1- or 2-bromo)-2-(4-pyridyl) ethylene hydrobromide. The mixture is refluxed for 1.5 hours and filtered hot from potassium bromide. Upon cooling to 0° C., a crystalline precipitate of 1-(p-chlorophenyl)-2-(4-pyridyl)-acetylene is formed, which upon recrystallization from alcohol melts at 119.5–122° C.

To a mixture of 38 parts of water and 68 parts of 95% sulfuric acid is added 8 parts of 1-(p-chlorophenyl)-2-(4-pyridyl)acetylene. This is heated to refluxing (142° C.) and held there for five minutes. The mixture is cooled and diluted with several volumes of water, followed by neutralization with caustic. A heavy yellow precipitate is formed, which is filtered off at room temperature and washed with water. On drying, 8.3 parts of 4-(p-chlorophenacyl)pyridine is obtained, representing a quantitative yield. Upon recrystallization from alcohol, bright yellow crystals are obtained which dry to a yellow-tan product melting at 94.5–96° C.

To a solution of 2.46 parts of 4-(p-chlorophenacyl)pyridine in 10.5 parts of glacial acetic acid at 20° C. is added dropwise a solution of 1.70 g. bromine in 2 parts of glacial acetic acid. A precipitate forms as the bromine hits the solution, which immediately redissolves, giving a clear light yellow solution. Shortly after the addition is complete, a cream colored crystalline precipitate begins to form. Precipitation is completed with the aid of ether, and the product filtered off, washed with ether, and dried. Approximately 4.16 parts of 4(ω-bromo-p-chlorophenacyl) pyridine hydrobromide are obtained melting at 223–224–228° C., representing a quantitative yield.

*Example III*

A mixture of 760 parts quinaldine (95% Reilly Tar and Chemical Co.), 530 parts p-chlorobenzaldehyde, and 357 parts acetic anhydride are boiled under reflux for 2.5 hours under an atmosphere of nitrogen. The solution is allowed to cool, whereupon it solidifies. After 16 hours it is melted and poured into ice and water to give about 4 liters total volume. The crude product is collected on the filter and washed free of acid. It is then extracted with 6,300 parts of boiling alcohol containing a little activated carbon. The alcohol extract on filtering and cooling deposits a yellow crystalline product which is collected on the filter, washed with alcohol and dried. The filtrate and washings are used to extract the crude residue three times more in a similar way. The total recovery is 654 parts. For analysis a small sample of this material was recrystallized from boiling alcohol; it is then melted at 142.8–143.2° C.

A mixture of 26.6 parts of 2-(p-chlorostyryl) quinoline and 222 parts of o-dichlorobenzene is heated to 50° C. until complete solution occurs. It is then cooled to 25° C. and 17 parts of bromine in 46 parts of o-dichloro-benzene is added; the temperature is raised to 180–190° C. and the solution boiled under reflux for two hours. It is then cooled and the precipitate is collected on the filter, washed with o-dichlorobenzene and ether and dried. The yield is 30 parts melting at 199–199.9° C.

Five parts of the brominated product above is treated with 5 parts of potassium hydroxide in 24 parts of alcohol at the boil for one hour. The mixture is filtered hot and the filtrate cooled to give 1 part of light brown product melting at 137–137.5° C.

Five parts of the acetylene prepared as above is treated with 15.6 parts of 65% sulfuric acid at the boil for five minutes. On cooling, dilution to 100 parts by volume and neutralization with ammonia, brilliant greenish-yellow colored 2-(p-chlorophenacyl) quinoline is obtained, melting at 140.2–141° C.

2-(p-chlorophenacyl) quinoline is dissolved in alcohol and treated with the equivalent amount of bromine (1 mol for 1 mol) at room temperature. After about 30 minutes the solution is diluted with water and the ω-bromo compound precipitates. It is collected on the filter and dried at 45° C. The melting point is 103–105° C.

I claim:

1. Compounds having the general formula

in which X is a halogen, R is a member of the group consisting of pyridine, benzopyridine and alkylpyridine radicals, and R' is a halogenated aryl radical.

2. Compounds having the general formula

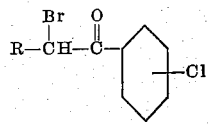

in which R is a pyridine radical.

3. 2-(ω-bromo-p-chlorophenacyl) pyridine.
4. 4-(ω-bromo-p-chlorophenacyl) pyridine.
5. 2-(ω-bromo-p-chlorophenacyl) quinoline.

JAMES M. SMITH, Jr.

REFERENCES CITED

The following references are of record in the file of this patent:

UNITED STATES PATENTS

| Number | Name | Date |
| --- | --- | --- |
| 2,414,398 | Smith | Jan. 14, 1947 |

OTHER REFERENCES

Beilstein, Vierte Auflage, vol. 7; pp. 210, 218, 221, 225, 234, and 235.